219-121 SR

MTR04 XR 3,889,272

(3)

United States Patent [19]

Lou et al.

[11] 3,889,272

[45] June 10, 1975

[54] METAL FILM RECORDING MEDIA FOR LASER WRITING

[75] Inventors: David Yuan Kong Lou, Chatham; Ronald Howard Willens, Warren, both of N.J.

[73] Assignee: Bell Telephone Laboratories, Incorporated, Murray Hill, N.J.

[22] Filed: May 30, 1974

[21] Appl. No.: 474,715

[52] U.S. Cl. ........................ 346/1; 117/8; 117/217; 346/76 L; 346/135

[51] Int. Cl. ........................ G01d 15/34

[58] Field of Search ........................ 346/135, 76 L, 1; 219/121 L, 121 LM; 117/8, 227, 160 R; 156/3

[56] References Cited

UNITED STATES PATENTS 3,314,073 4/1967 Becker ........................ 346/76 L
3,560,994 2/1971 Wolff et al. ........................ 346/135
3,720,784 3/1973 Maydan et al. ........................ 346/76 L X
3,747,117 7/1973 Fiechter ........................ 346/135 X

*Primary Examiner*—Joseph W. Hartary
*Attorney, Agent, or Firm*—P. V. D. Wilde

[57] ABSTRACT

Thin metal film systems supported on transparent substrates are described for use in laser micromachining of high resolution facsimile images. An anti-reflection film, which requires less energy for micromachining than bismuth films of equal optical opacity, is provided by forming a thin layer of fine-grain crystallites of the metal between the incident laser radiation and a layer of coarse-grain crystallites of the metal.

12 Claims, 5 Drawing Figures

METAL FILM RECORDING MEDIA FOR LASER WRITING

BACKGROUND OF THE INVENTION

1. Field of the Invention

The invention relates to a recording system and, in particular, to one in which information is recorded with a laser in a radiation-absorbing film.

2. Description of the Prior Art

Improvements in apparatus for recording information have been described by D. Maydan, M. I. Cohen, and R. E. Kerwin in U.S. Pat. No. 3,720,784, issued Mar. 13, 1973. In that patent is described apparatus capable of forming a large number of short duration amplitude-modulated pulses of spatially coherent radiation to create positive or negative pictorial images. The images consist of a pattern of small discrete holes in a thin metal radiation-absorbing film. The metal film is supported on a transparent substrate. In one typical mode of operation, the short laser pulses evaporate a small amount of the metal film in the center of the spot upon which the beam is incident and melt a large area around this region. Surface tension then draws the melted material toward the rim of the melted area, thereby displacing the metal film from a nearly circular region. By varying the amplitude of the very short laser pulses, the diameter of the region that is melted can be varied, and the area of the hole increases monotonically with increasing pulse amplitude. The holes are formed in parallel rows with the centers of the holes equally spaced along each row and from row to row. The largest holes are of diameter approximately equal to the center-to-center spacing of the holes. In this way, it is possible to achieve a wide range of shades of grey. The apparatus is particularly useful for recording graphic copy or images that are transmitted over telephone lines, such as from facsimile transmitters.

In that patent, the preferred radiation absorbing film comprises a thin layer of bismuth (e.g., about 500 Angstroms) deposited on a polyester substrate such as Mylar (trademark of E. I. Dupont de Nemours and Co., Inc.).

It can be shown that for a single layer that transmits 1 percent of the incident optical radiation, where it is assumed that single element metal films (1) are bounded by parallel planes, (2) are homogeneous in structure and (3) have optical properties that can be completely described in terms of the bulk optical constants, then reflection losses may amount to from 60 percent to 100 percent of the incident laser energy. Reduction of film reflectance is therefore important in any effort to lower machining energy requirements.

Conventionally, an anti-reflection effect is achieved by matching the optical impedance of an opaque metal film to that of the incident radiation by forming layers of dielectrics with the proper thicknesses and refractive indices between the metal film and the incident radiation. The anti-reflection layer, serves to substantially increase the amount of energy absorbed from the incident radiation.

In U.S. Pat. No. 3,560,994, issued Feb. 2, 1971 to K. Wolff and H. Hamisch, it is taught that the machining properties of bismuth films are improved by superimposing a coating which decreases the reflectivity of the incident laser beam. Specifically, that patent teaches that such an anti-reflection film must have an index of refraction $n$ of about 4, and, accordingly, silicon ($n = 4.5$) or germanium ($n = 4.4$) are preferred.

SUMMARY OF THE INVENTION

In accordance with the invention, an anti-reflection layer for a radiation-absorbing metal film is formed by interposing a layer of fine-grain crystallites of the metal between the incident laser radiation and a layer of coarse-grain crystallites of the metal. A preferred embodiment is directed to bismuth and tin films employed in laser micrographic recording systems. The layer of fine-grain crystallites may be formed either by variation of the conditions used in depositing bismuth or tin or by first depositing a very thin layer of a naturally fine-grained material, such as $Mg_xIn_{1-x}$, where $x$ preferably is 0.30. This material serves as a "pinning" layer to stabilize the formation of fine-grain crystallites of the metal film.

DETAILED DESCRIPTION OF THE INVENTION

Figures 1, 2A, 2B, 2C:
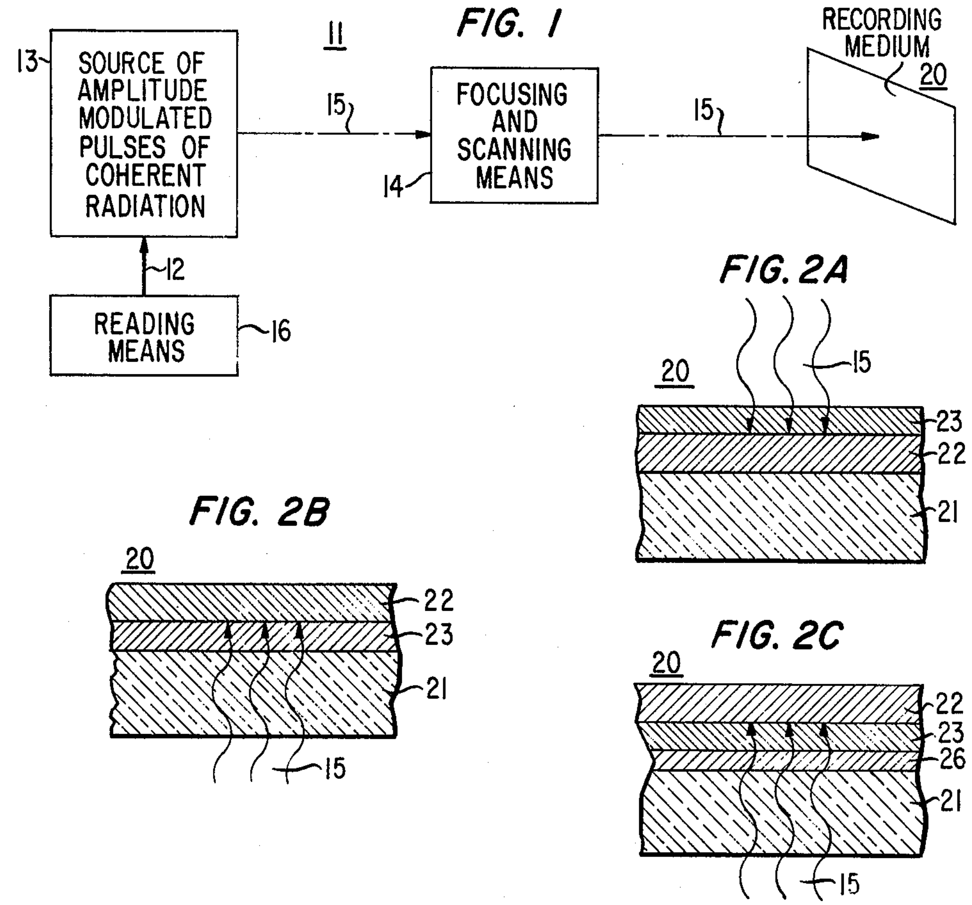
FIG. 1 depicts in block form illustrative apparatus used to record information on a metal film by laser writing.
FIGS. 2A, 2B, and 2C are fragmentary cross-sectional views depicting alternate methods of recording information on a metal film supported on a substrate.

Apparatus 11 used for laser micromachining of thin metal films is schematically represented in FIG. 1. The apparatus comprises a source 13 of optical pulses of spatially coherent radiation, which are amplitude-modulated in accordance with a received signal 12, and focusing and scanning means 14 for writing on a recording medium 20 with these optical pulses. Source 13 of optical pulses illustratively includes an intracavity modulator, such as that described by D. Maydan in U.S. Pat. No. 3,703,687, issued Nov. 21, 1972. Also shown in FIG. 1 is reading means 16, which may or may not be associated in close proximity with the foregoing components.

Reading means 16 provides a facsimile signal by scanning an object whose image is to be recorded on recording medium 20. Typical objects are a picture, an X-ray, a chart, a plot, a page of writing, a page of a book, a micro-film image, a portion of newspaper print and a three-dimensional object. By illuminating the object or portions of the object and by detecting the relative intensity of the light reflected or scattered from the object in a time sequential manner, it is possible to "read" and form a facsimile signal representative of the object. An example of such reading means 16, or facsimile transmission apparatus, is disclosed in a patent application by H. A. Watson, entitled "Compact Flat-bed Page Scanner," Ser. No. 445,051, filed Feb. 25, 1974.

To write an image of the scanned object on recording medium 20, an electrical signal representative of the image is transformed into beam 15 of amplitude-modulated pulses of coherent optical radiation which are short in duration compared with the time interval between pulses. Beam 15 is then focused onto the film and scanned across it by focusing and scanning means 14.

As shown in FIGS. 2A, 2B, and 2C, the recording medium 20 comprises a radiation-absorbing film, or metal film, 22 on a transparent substrate 21. Each focused pulse of coherent radiation heats up a very small discrete region of the film. If, for example, the temperature for any part of the region on which the laser pulse is incident reaches the boiling point of the film or if a sufficiently large area is melted, a hole or crater is formed in the film. The size of the hole that is formed increases monotonically with increasing energy density of the laser pulse. The holes can be located in parallel rows with the centers of the holes equally spaced along each row and from row to row. The largest holes are of diameter nearly equal to the center-to-center spacing of the holes. As a consequence, such films may, under the proper conditions, yield a useful grey scale in the image recorded.

The Maydan et al. U.S. Pat. No. 3,720,784 describes a preferred recording medium comprising a thin radiation-absorbing film of bismuth supported on a transparent polyester substrate. In accordance with the present invention, a reduction in laser energy required to machine holes in a thin radiation-absorbing film over an optical density range of about 1 to 3 is obtained by forming an anti-reflection layer 23 between the radiation-absorbing film 22 and the incident radiation 15. However, contrary to the teaching of Wolff et al., U.S. Pat. No. 3,560,994, the anti-reflection layer 23 need not necessarily have an index of refraction $n$ of approximately 4. Rather, a layer of fine-grain crystallites of the same metal as the radiation-absorbing layer serves as the anti-reflection layer. The anti-reflection layer is interposed between the incident laser radiation and the radiation-absorbing film, as shown in the case of air-incident, or front, machining (FIG. 2A) and substrate incident, or back, machining (FIG. 2B). The theoretical basis for using a layer of fine-grain crystallites as an anti-reflection layer is developed in the Appendix.

In the case of back machining, it would be highly desirable if the anti-reflection layer could also serve as a sealing layer to prevent impurity transfer between the plastic substrate and the metal film. In the case of front machining, the anti-reflection layer is advantageously scratch resistant. In addition, the material for the anti-reflection layer must be stable with respect to the opaque metal layer. Bismuth and tin meet these criteria and accordingly are preferred.

For back machining, the layer of fine-grain crystallites may be conveniently formed by one of two techniques, although there may be other suitable techniques as well. For example, the layer of fine-grain material may be formed directly on the substrate itself. Since well-known vacuum deposition procedures, e.g., sputtering, are usually employed to deposit the radiation-absorbing film, these same procedures, with changes in conditions of deposition, may be used to form a layer of fine-grain crystallites, as is well known in the art.

Alternatively, a very thin layer of a material that easily forms fine-grain crystallites may serve as a "pinning" layer 26 (FIG. 2C) that will force the first several atomic layers of the metal film to form fine-grain crystallites, substantially independent of deposition conditions. For example, where bismuth (or tin) is the radiation absorbing film, a very thin layer of $Mg_xIn_{1-x}$, where $x$ preferably is about 0.30, serves as a convenient pinning film. The MgIn system is an attractive sensitizing layer for controlling film nucleation properties for several reasons. First it tends to crystallize in small grains. Also, magnesium reacts readily with most metals. Compound formation thus apparently stabilizes the initial grain structure to that of the MgIn sensitizing layer. Furthermore, the high stability of MgIn makes it an effective barrier coating. The maximum solubility of magnesium in indium is about 35 to 40 atom percent; a value of $x = 0.25$ in the vacuum sputtering source is sufficient to put enough magnesium on the substrate to stabilize the bismuth film. (For $x = 0.25$ in the source, this yields about $x = 0.30$ in the film.) This pinning film 26 should not exceed approximately 50 Angstroms in thickness; otherwise, machining properties of the recording medium would be adversely affected.

The effectiveness of an anti-reflection layer of the same metal as the radiation-absorbing film is a function of the physical dimensions of the two layers. If the crystallites are too small, then to achieve the anti-reflection effect would require too thick a layer. If the crystallites are too large, this layer approaches the coarse-grain layer of the radiation-absorbing film, and the anti-reflection properties are reduced. Consistent with these considerations, the predominant average grain size of the anti-reflection layer 23 should range from about 50 Angstroms to 300 Angstroms.

If the anti-reflection layer is too thin, there is insufficient change in reflectivity to achieve the desired anti-reflection effect. If the layer is too thick, then an undesirable increase in energy is required to machine the radiation-absorbing film. Consistent with these considerations, the thickness of the layer of fine-grain crystallites should range from about 100 Angstroms to about 400 Angstroms.

The foregoing discussion suggests the need for two layers of different grain size. If only fine-grain material were present, such a layer having an optical transmission of about 1 percent, for example, would be too thick to easily machine. Thus, a layer of coarse-grain material is additionally required. The typical vacuum sputtering conditions for bismuth usually yield a layer having a predominant average grain size of about 600 Angstroms, which is adequate for the application described above. This coarse-grain layer is deposited to a thickness sufficient to give the desired opacity.

In theory, the foregoing description is sufficient to characterize the invention in terms of two distinct layers of the same metal. However, in practice there is usually one compositional layer, ranging in crystallite size from within the fine-grain size limits given above, to the coarse-grain size, with a gradual transition from one to the other. This is a consequence of the deposition conditions.

EXAMPLES a. The MgIn System

A sputtering target of nominally $Mg_{0.25}$-$In_{0.75}$ was prepared by mixing 13.7 gm of 99.95 percent pure magnesium chips with 198 gm of 99.9999 percent pure indium ingot. This was placed in a glass container, then alternately pumped to $10^{-5}$ Torr and flushed with argon gas several times. The container was then back filled with argon to 0.6 atmosphere, sealed off, and heated at 400° C for 24 hours. The magnesium was observed to dissolve readily in the indium liquid, and the solution solidified at approximately 300° C. Upon cooling, the alloy was then machined to a disk having a diameter of 2.75 in. and a thickness of 0.25 in. X-ray fluorescence analysis showed that across the top and bottom face of the disk, the indium concentration was uniform to within ±0.1 atom percent of the total amount present. The disk-shaped target was bonded onto a 3 inch diameter aluminum target holder with silver-containing epoxy. MgIn films were then deposited by dc diode sputtering. Typical sputtering parameters are listed in Table I.

The chemical composition of both the sputtered film and the target material were analyzed by atomic absorption. The film contained 30 atom percent Mg and 70 atom percent In, while the target source contained 24 atom percent Mg and 76 atom percent In. Scanning electron micrographs showed the film to be very granular, with a significant number of voids between the grains.

b. Bilayer Systems

Three specific examples of film systems demonstrating the usefulness of the invention were prepared. They are designated MgIn(7)-Sn, MgIn(5)-Bi, and MgIn(3)-Bi, where $Mg_{0.25}In_{0.75}$ was first sputtered onto a flexible polyester film, here Celanar (trademark of Celanese Corporation) for the time indicated (in minutes). The metal radiation-absorbing film (Sn or Bi) was then vacuum sputtered to a thickness sufficient to render the film system about 1 percent transmitting. Typical sputtering parameters are listed in Table I.

erating at a wavelength of 1.06 μm. There, the improved characteristics of the specified anti-reflection layers in accordance with the invention may be seen. A bismuth radiation-absorbing film without an anti-reflection layer is included for comparison.

Table II below lists measurements obtained by laser micromachining of several examples of metal film recording media. Included in Table II is the threshold pulse machining energy required for a laser beam of diameter 8 μm and pulse duration of 30 nsec from a neodymium-doped yttrium aluminum garnet laser. Also listed is the pulse energy needed to machine a hole 6 μm in diameter and the optical transmission through the film at 0.6328 μm and at 1.15 μm. The measured reflectance at these two wavelengths is also given. It can be seen that the metal film recording media in accordance with the invention requires less energy to micromachine. For comparison, also listed are a bismuth film without an anti-reflection coating, such as disclosed by Maydan et al. in U.S. Pat. No. 3,720,784, a tin film without an anti-reflection coating and a bismuth film with a germanium anti-reflection coating, such as disclosed by Wolff et al. in U.S. Pat. No. 3,560,994.

The aging characteristics of films fabricated in accordance with the invention are considerably improved over prior art films. For example, defining failure time as the time required for film transmission to increase by 50 percent, the system designated MgIn (7)-Sn has a failure time (at 25° C) of $2 \times 10^3$ hours, as compared with $2 \times 10^1$ hours for a single layer Sn film. For the sys-

TABLE I

SPUTTERING CONDITIONS FOR FILMS

| | | | | | |
|---|---|---|---|---|---|
| Nominal Target Composition | $Mg_{0.25}In_{0.75}$ | Sn | | Bi | |
| Target Area | 45.6 cm² | 45.6 cm² | | 45.6 cm² | |
| Target to Substrate Distance | 7.0 cm | 7.0 cm | | 7.0 cm | |
| Sputtering Voltage | 2.61 kV | 2.69 kV | | 2.15 kV | |
| Sputtering Current | 10.0 mA | 5.0 mA | | 2.0 mA | |
| Argon Pressure | 37 m Torr | 45 m Torr | | 37 m Torr | |
| Sample Designation | | MgIn(7)-Sn | Mg(5)-Bi | | Mg(3)-Bi |
| Sputtering Time of $Mg_{0.25}In_{0.75}$ | | 7 min | 5 min | | 3 min |
| Transmission of MgIn Layer at 0.6328 μm* | | 62.6% | 75.1% | | 86.2% |
| Sputtering Time of Second Layer | | 70 min | 11 min | | 7 min |

*After subtracting out the initial transmission of the polyester substrate without the MgIn Layer.

TABLE II

LASER MICROMACHINING OF METAL FILM RECORDING MEDIA

| System | Threshold Energy,nJ | Energy Required to Machine a 6-μm Hole, nJ | Transmission, % 0.6328μm | Transmission, % 1.15μm | Air-Incident Reflectance, % 0.6328μm | Air-Incident Reflectance, % 1.15μm | Substrate-Incident Reflectance, % 0.6328μm | Substrate-Incident Reflectance, % 1.15μm |
|---|---|---|---|---|---|---|---|---|
| MgIn(3)-Bi | 5.7[1] | 16[1] | 1.3[3] | 1.1[3] | 65[3] | 55[3] | 30[3] | 38[3] |
| MgIn(5)-Bi | 7[1] | 25[1] | 1.4[3] | 0.98[3] | 36[3] | 32[3] | 30[3] | 29[3] |
| MgIn(7)-Sn | 19[1] | 58[1] | 0.70[3] | 2.8[3] | 2.8[3] | 4.0[3] | 21[3] | 23[3] |
| Ge/Bi | 12.5[2] | 30[2] | 0.16[3] | — | 22[4] | 28[4] | 24[4] | 40[4] |
| Bi | 22[1] | 31[1] | 1[3] | — | 62[3] | 65[3] | 68[3] | 70[3] |
| Sn | 17[1] | 42[1] | 2.1[3] | — | — | 22[3] | — | 40[3] |

Notes:
[1]Substrate-incident machining.
[2]Air-incident machining.
[3]Measured values.
[4]Calculated values.

Figure 3:
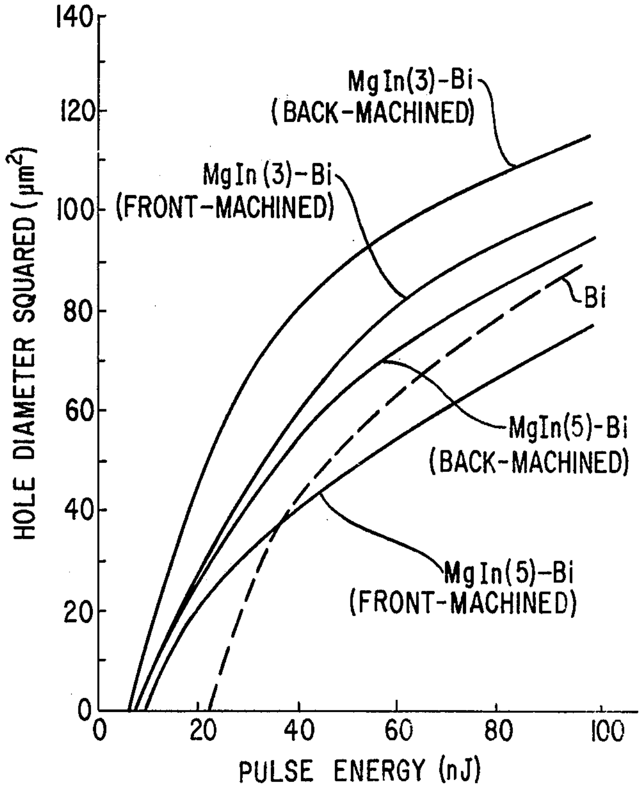
FIG. 3 illustrates, on coordinates of hole diameter squared (in $\mu m^2$) and laser energy (in nJ), the energy required for laser micromachining holes in various metal film recording media.

Shown in FIG. 3 is a plot of hole diameter squared for holes produced in a radiation-absorbing film as a function of applied laser energy from a laser having a beam diameter of 8 μm, a pulse duration of 30 nsec, and optem designated MgIn(3)-Bi, based on aging characteristics, an extrapolated ambient life of $8 \times 10^4$ has been calculated, as compared with a life of $4 \times 10^3$ hours for single layer bismuth.

In the course of laser machining, the anti-reflection layer is also melted. It is expected that substrate properties will play a role in machining performance. In particular, deposition of the film systems on low energy surfaces such as isobutyl methacrylate should further reduce machining energy, as described in a patent application by D. Y. K. Lou, H. A. Watson, and R. H. Willens entitled "Metal Film Recording Media for Laser Writing," Ser. No. 457,788, filed Apr. 4, 1974.

The use of a layer of fine-grain crystallites of a metal to serve as an anti-reflection layer for a layer of coarse-grain crystallites of that metal has been described in terms of a preferred embodiment directed to laser micromachining thin metal films for recording information. Nevertheless, it is clear that the generic concept set forth herein is applicable to a wide range of applications in which anti-reflection films are or may be employed in conjunction with metal radiation-absorbing films. Without being limiting, examples of such applications include laser machining of metallization in integrated circuits, laser machining of chromium masks used in integrated circuit fabrication, etc.

Appendix

It is well known that the optical properties of thin films depend critically on their structure; see, e.g., O. S. Heavens, *Optical Properties of Thin Solid Films*, Academic Press, 1955. This structure is determined by the method of deposition, substrate conditions and the film thickness. In particular, anomalous absorption is usually observed for very thin films, approximately 100 Angstroms in thickness; see, e.g., Vol. 37, *Journal of Applied Physics*, pp. 2775–2781, 1966.

The optical properties of a system consisting of small spherical particles of metal embedded in an infinite homogeneous dielectric have been calculated by J. C. Maxwell-Garnett in Vol. 203, *Philsophical Transactions of the Royal Society*, pp. 385–420, 1904. In the limit where the particle size is small compared to the wavelength, the Clausius-Mosotti equation can be used to obtain $$\frac{\epsilon_c - \epsilon_d}{\epsilon_c + 2\epsilon_d} = Q \left(\frac{\epsilon - \epsilon_d}{\epsilon + 2\epsilon_d}\right) \quad (1)$$

where $\epsilon_c$ = complex dielectric constant of the system = $\epsilon_{1c} - i\epsilon_{2c}$ $\epsilon$ = complex dielectric constant of the metal particles = $\epsilon_1 - i\epsilon_2$ $\epsilon_d$ = dielectric constant of the embedding medium Q = packing fraction of the metal particles.

The quantity Q is a theoretical concept describing the ratio of the volume of metal particles relative to the total available volume. It is difficult to correlate this ratio with any easily measurable experimental quantity. The theory assumes that each crystallite grain is coated with an oxide layer of fixed thickness, so that the smaller the grain size, the smaller the volume of metal relative to the total volume, and hence the smaller the value of Q. The Maxwell-Garnett theory further assumes that $\epsilon$ is given by the bulk dielectric constant, so that $$\epsilon_1 = n^2 - k^2$$
$$\epsilon_2 = 2nk \quad (2)$$

where n - ik is the complex refractive index of the bulk metal. Solution of Eq. (1) then gives the dielectric constant of the system $$\epsilon_{1c} = \frac{D_1}{D_O}$$
$$\epsilon_{2c} = \frac{D_2}{D_O} \quad (3)$$

where $$D_O = [\epsilon_1(1-Q)+\epsilon_d(2+Q)]^2 + [\epsilon_2(1-Q)]^2$$

$$D_1 = \epsilon_d\{[\epsilon_1(1+2Q)+2\epsilon_d(1-Q)] \times [\epsilon_1(1-Q)+\epsilon_d(2+Q)] + \epsilon_2^2(1-Q)(1+2Q)\}$$

$$D_2 = \epsilon_d(9\epsilon_2\epsilon_d Q).$$

In a real film system, the dielectric medium in between the grains can be oxides, air space, or the substrate material. The grains would be nonuniform in shape and size. Furthermore, in the limit of fine-grain crystallites grain boundary scattering determines the electronic mean free path, which leads to a modification in the intrinsic bulk dielectric constant. The calculation based on the Maxwell-Garnett theory is therefore a highly idealized representation of reality. The effect of film structure on the optical properties and laser machining characteristics of thin metal films on the basis of the Maxwell-Garnett theory is now described.

a. Single Layer Films

The optical properties of a film made up of small spheres of indium can be calculated as follows. The values of the bulk optical constants at 0.6328 $\mu$m, ($n_b$, $k_b$) = (0.67, 4.62). It can be shown that a 1.0 percent transmitting film with these optical constants has a thickness $d$ = 490 Angstroms and an absorption A = 12 percent. Assuming a packing fraction of Q = 0.85, the optical constants, calculated from Eq. (3), are $(n, k)$ = (6.72, 3.76). It can be shown that a 1.0 percent transmitting film with these optical constants has a thickness $d$ = 450 Angstroms and an absorption A = 39 percent, which is in fair agreement with experimental values. This gives an A/d value of 0.087. The ratio of A/d is useful in comparing the relative absorption efficiencies of various film systems. A value of A/$d$ = 0.087 is a factor of 3.6 improvement over the A/$d$ value of 0.024 for a homogeneous bulklike indium film. If it is further assumed that all the light energy absorbed by the metal contributes to hole nucleation, then it can be shown that the machining efficiency of a single layer film can be evaluated according to the formula $$\eta = \frac{A}{QH_c d} \quad (4)$$

where $\eta$ = figure of merit of machining

A = film absorption $d$ = film thickness $Q$ = packing density $H_c$ = critical enthalpy density that must exist for machining to occur, i.e., the relative ease to produce holes in different film systems for a given absorbed energy density.

Assuming the boiling point mode for both indium and bismuth, then $\eta$ for indium at Q = 0.85 is 1.31, normalized to $\eta$ = 1 for bulklike bismuth. This compares with an experimental ratio of threshold energies of 1.35.

b. Bilayer Films

The preceding discussion shows that it is possible to enhance the laser machining characteristics of thin metal films very significantly by appropriate control of their structure. Thus, by proper control of film growth, it should be possible to produce, with the same material, layers of different optical constants, thereby achieving an anti-reflection effect.

Assuming a simple bilayer structure consisting of a layer of fine-grain crystallites and a layer of coarse-grain crystallites, then the reflectance, transmittance, and absorptance of the film system can be calculated with well-known formulas. Following the discussion in the previous section, the machining figure of merit of such a film system may then be evaluated according to the following formula $$\eta = \frac{A}{H_c(d_b+Qd_f)} \quad (5)$$

where $\eta$ = figure of merit for machining

A = film absorption $d_b$ = thickness of the bulklike coarse-grain layer $d_f$ = thickness of the fine-grain layer Q = packing density in the fine-grain layer $H_c$ = critical enthalpy density for machining.

Assume a film structure of Celanar/Bi film (fine grains in air)/Bi film (bulklike). As mentioned previously, it is difficult to correlate the theoretical concept of packing fraction Q with any easily measurable experimental quantity. Calculations show, however, that the machining efficiency of the bilayer film system described above is improved over that of a single layer film system of the same transmission for a wide range of values of $d_b$ and Q. As a specific example, for the case when the packing fraction for the fine-grain layer is Q = 0.84, the optical constants are $(n_f, k_f)$ = (4.9, 0.77). The bulk optical constants are $(n_b, k_b)$ = (4.5, 5.0). Even with this very simplistic bilayer structure, it is possible to show that 1.0 percent transmitting films may be fabricated which are nearly 100 percent absorbing. The machining efficiency of such a film system can be substantially enhanced over that of a bulklike film. For this particular example, it appears that improvements of as much as 1.4 over that of a bulklike film can be expected.

What is claimed is:

1. A method for recording information in a metal film recording medium by selectively removing portions of a thin metal radiation-absorbing film supported on a flexible transparent substrate, the method comprising exposing the metal radiation-absorbing film to modulated coherent radiation of sufficient power and duration to remove the portions, characterized in that the film comprises a first layer of fine-grain crystallites of the metal and a second layer of coarse-grain crystallites of the metal.

2. An anti-reflection film coating on a surface of a metal radiation-absorbing film for reducing reflectance of incident radiation, characterized in that the anti-reflection film comprises at least a layer of fine-grain crystallites of the metal interposed between the incident radiation and coarse-grain crystallites of the metal.

3. A metal film recording medium for recording information by exposure of the medium to a laser beam, the medium comprising a flexible transparent substrate and a metal radiation-absorbing film formed on the substrate, characterized in that the film comprises at least a layer of fine-grain crystallites of the metal and a layer of coarse-grain crystallites of the metal.

4. The medium of claim 3 in which the grain size of the layer of fine-grain crystallites ranges from about 50 Angstroms to 300 Angstroms and in which the thickness of the layer of the fine-grain crystallites ranges from about 100 Angstroms to 400 Angstroms.

5. The medium of claim 4 in which the layer of coarse-grain crystallites is formed on the substrate and the layer of fine-grain crystallites is formed on the layer of coarse-grain crystallites.

6. The medium of claim 4 in which the layer of fine-grain crystallites is formed on the substrate and the layer of coarse-grain crystallites is formed on the layer of fine-grain crystallites.

7. The medium of claim 6 in which the film additionally comprises a layer of $Mg_xIn_{1-x}$, where $x$ is about 0.30, interposed between the layer of fine-grain crystallites and the substrate.

8. The medium of claim 5 in which the layer of $Mg_xIn_{1-x}$ has a maximum thickness of about 50 Angstroms.

9. The medium of claim 3 in which the metal radiation-absorbing film is bismuth or tin.

10. The medium of claim 9 in which the metal radiation-absorbing film is bismuth.

11. The medium of claim 3 in which the medium has an optical density ranging from about 1 to 3.

12. The medium of claim 3 in which the transparent substrate is a polyester film.

* * * * *